United States Patent
Dahlquist et al.

(10) Patent No.: US 12,159,372 B2
(45) Date of Patent: Dec. 3, 2024

(54) SYSTEMS AND METHODS OF MULTIVIEW STYLE TRANSFER

(71) Applicant: LEIA INC., Menlo Park, CA (US)

(72) Inventors: Nicolas Dahlquist, Redwood City, CA (US); Saravana Gunaseelan, Cupertino, CA (US); Puneet Kohli, Sunnyvale, CA (US); Edward Li, Fremont, CA (US)

(73) Assignee: LEIA Inc., Menlo Park, CA (US)

( * ) Notice: Subject to any disclaimer, the term of this patent is extended or adjusted under 35 U.S.C. 154(b) by 23 days.

(21) Appl. No.: 17/878,010

(22) Filed: Jul. 31, 2022

(65) Prior Publication Data

US 2022/0383465 A1  Dec. 1, 2022

Related U.S. Application Data

(63) Continuation of application No. PCT/US2021/015570, filed on Jan. 28, 2021.

(Continued)

(51) Int. Cl.
*G06T 5/50*  (2006.01)
*G06N 3/08*  (2023.01)
(Continued)

(52) U.S. Cl.
CPC .......... *G06T 5/50* (2013.01); *G06N 3/08* (2013.01); *G06T 5/20* (2013.01); *G06T 5/73* (2024.01);
(Continued)

(58) Field of Classification Search
None
See application file for complete search history.

(56) References Cited

U.S. PATENT DOCUMENTS

| 9,105,117 B2 | 8/2015 | Asente et al. |
| 9,113,043 B1 | 8/2015 | Kim et al. |

(Continued)

FOREIGN PATENT DOCUMENTS

| CN | 103026387 | 4/2013 |
| CN | 105723705 | 6/2016 |

(Continued)

OTHER PUBLICATIONS

International Search Report and Written Opinion (ISRWO) from the International Searching Authority (ISA/KR) dated May 18, 2021 (9 pages) for counterpart parent PCT Application No. PCT/US2021/015570.

(Continued)

*Primary Examiner* — Joni Hsu
(74) *Attorney, Agent, or Firm* — Schwegman Lundberg & Woessner, P.A.

(57) ABSTRACT

A system and method of multiview style transfer apply a style transfer to individual views of a multiview image in a way that produces consistent results across all images. In some embodiments, the multiview style transfer includes receiving first and second images representative of first and second perspectives of a scene and first and second disparity maps corresponding to the first and second images, generating a first stylized image, generating a stylized shifted image based on the first stylized image and the first disparity map, generating a second stylized image based on a guided filter of the stylized shifted image and the second image, and generating a first and second stylized image based on the stylized shifted images and the disparity maps.

28 Claims, 6 Drawing Sheets

Related U.S. Application Data (60) Provisional application No. 62/983,739, filed on Mar. 1, 2020.

(51) Int. Cl.
*G06T 5/20* (2006.01)
*G06T 5/73* (2024.01)
*G06T 7/55* (2017.01)
*H04N 13/111* (2018.01)
*H04N 13/122* (2018.01)
*H04N 13/156* (2018.01)
*H04N 13/351* (2018.01)
*H04N 13/00* (2018.01)

(52) U.S. Cl.
CPC .............. *G06T 7/55* (2017.01); *H04N 13/111* (2018.05); *H04N 13/122* (2018.05); *H04N 13/156* (2018.05); *H04N 13/351* (2018.05); *G06T 2207/20081* (2013.01); *G06T 2207/20084* (2013.01); *G06T 2207/20192* (2013.01); *H04N 2013/0081* (2013.01)

(56) References Cited

U.S. PATENT DOCUMENTS

| | | | |
|---|---|---|---|
| 9,128,226 | B2 | 9/2015 | Fattal et al. |
| 9,201,270 | B2 | 12/2015 | Fattal et al. |
| 9,298,168 | B2 | 3/2016 | Taff et al. |
| 9,323,892 | B1 | 4/2016 | Paris, III |
| 9,361,725 | B2 | 6/2016 | Wu et al. |
| 9,389,415 | B2 | 7/2016 | Fattal et al. |
| 9,459,461 | B2 | 10/2016 | Santori et al. |
| 9,557,466 | B2 | 1/2017 | Fattal |
| 9,785,119 | B2 | 10/2017 | Taff et al. |
| 10,345,505 | B2 | 7/2019 | Fattal |
| 10,649,128 | B2 | 5/2020 | Fattal et al. |
| 10,798,371 | B2 | 10/2020 | Fattal |
| 10,830,939 | B2 | 11/2020 | Fattal et al. |
| 10,884,175 | B2 | 1/2021 | Fattal |
| 10,928,677 | B2 | 2/2021 | Aieta et al. |
| 11,593,615 | B2 | 2/2023 | Hua et al. |
| 2009/0067740 | A1* | 3/2009 | Zhu .......................... G06T 5/20 382/260 |
| 2013/0010063 | A1 | 1/2013 | Redmann |
| 2013/0113795 | A1 | 5/2013 | Tsang et al. |
| 2013/0136337 | A1 | 5/2013 | Asente et al. |
| 2014/0210810 | A1 | 7/2014 | Davidson et al. |
| 2016/0295200 | A1 | 10/2016 | Bruls et al. |
| 2017/0004582 | A1 | 1/2017 | Engström et al. |
| 2018/0082407 | A1 | 3/2018 | Rymkowski et al. |
| 2018/0192032 | A1 | 7/2018 | Freeman et al. |
| 2018/0205929 | A1 | 7/2018 | Fattal |
| 2018/0357981 | A1 | 12/2018 | Ng et al. |
| 2019/0026956 | A1 | 1/2019 | Gausebeck et al. |
| 2019/0228587 | A1 | 7/2019 | Mordvintsev et al. |
| 2020/0151938 | A1* | 5/2020 | Shechtman ............ G06N 3/045 |
| 2021/0097749 | A1* | 4/2021 | Katz .................... H04N 13/254 |
| 2021/0233303 | A1 | 7/2021 | Takahashi |

FOREIGN PATENT DOCUMENTS

| | | |
|---|---|---|
| CN | 108205813 | 6/2018 |
| CN | 108924528 | 11/2018 |
| CN | 108924528 A | 11/2018 |
| CN | 109863537 | 6/2019 |
| CN | 110326001 | 10/2019 |
| CN | 110458939 | 11/2019 |
| CN | 110458939 A | 11/2019 |
| CN | 110636331 | 12/2019 |
| CN | 110049303 | 8/2021 |
| CN | 115280788 | 6/2024 |
| EP | 4115622 | 1/2023 |
| JP | 2012060345 | 3/2012 |
| JP | 2012060345 A | 3/2012 |
| JP | 2013524625 | 6/2013 |
| JP | 2013225740 | 10/2013 |
| JP | 2023515649 | 4/2023 |
| JP | 7498288 | 6/2024 |
| WO | 2012038856 A1 | 3/2012 |
| WO | 2018106987 A1 | 6/2018 |
| WO | 2019139858 A1 | 7/2019 |
| WO | 2020004013 | 1/2020 |
| WO | 2021178079 | 9/2021 |
| WO | 2022060387 A1 | 3/2022 |
| WO | 2022125128 A1 | 6/2022 |

OTHER PUBLICATIONS

Hsueh-Ti Derek Liu, et al., Paparazzi: Surface Editing by way of Multi-View Image Processing, ACM Trans. Graph., Nov. 2018, pp. 1-11, vol. 37, No. 6, Article 221.

Fattal, David et al., "A multi-directional backlight for a wide-angle, glasses-free three-dimensional display," Nature, Mar. 21, 2013, pp. 348-351, vol. 495, Macmillan Publishers Limited, 2013.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al., "Holographic 3-D Displays—Electro-holography within the Grasp of Commercialization," Advances In Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

"Chinese Application Serial No. 202180019693.7, Office Action mailed Nov. 16, 2023", w English Translation, 33 pgs.

"Japanese Application Serial No. 2022-552455, Notification of Reasons for Rejection mailed Dec. 26, 2023", W English Translation, 6 pgs.

"International Application Serial No. PCT US2021 015570, International Preliminary Report on Patentability mailed Sep. 15, 2022", 6 pgs.

"European Application Serial No. 21764562.1, Extended European Search Report mailed Feb. 22, 2024", 9 pgs.

"Japanese Application Serial No. 2022-552455, Response filed Feb. 19, 2024 to Notification of Reasons for Rejection mailed Dec. 26, 2023", w English claims, 17 pgs.

"Chinese Application Serial No. 202180019693.7, Response Filed Mar. 29, 2024 to Office Action mailed Nov. 16, 2023", w English Claims, 35 pgs.

Chao, Zhang, "Acquisition of Parallax Images for Multi-View Auto-Stereoscopic Display Based on SIFT Matching Algorithm", (Acta Optica Sinica, 07), (Jul. 15, 2010), 5 pgs.

"Canadian Application Serial No. 3,170,378, Examiners Rule 86(2) Report mailed Sep. 12, 2023", 5 pgs.

"European Application Serial No. 21764562.1, Response to Communication pursuant to Rules 161(2) and 162 EPC filed Mar. 30, 2023", 29 pgs.

* cited by examiner

SYSTEMS AND METHODS OF MULTIVIEW STYLE TRANSFER

CROSS-REFERENCE TO RELATED APPLICATIONS

This application is a continuation patent application of and claims priority to International Application No. PCT/US2021/015570, filed Jan. 28, 2021, which claims the benefit of priority to U.S. Provisional Patent Application Ser. No. 62/983,739, filed Mar. 1, 2020, both of which are incorporated by reference in their entirety herein.

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs.

Content and related information displayed on electronic displays is generally rendered using a graphics processing unit (GPU) and the passed to a display driver. In some cases, especially images or photographs, original content may be manipulated or modified prior to rendering. Manipulation or modification may be provided using the GPU or another processor associated with displaying the information, for example.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples in accordance with the principles described herein provide multiview style transfer with application to electronic display. In particular, embodiments of the principles described herein may provide a method of applying style transfer to individual views of a multiview image in a way that produces consistent results across all images. In some embodiments, the multiview style transfer may run with graphics processing unit (GPU) acceleration on a mobile device. According to various embodiments, multiview style transfer includes a modular pipeline where individual algorithms can be de-coupled from the system.

In some embodiments, a neural network may be employed to provide neural style transfer to multiview images having more than two viewpoints. According to various embodiments, the multiview style transfer described herein may result in style transfer that is substantially consistent between all views, that uses stereo information from both of a pair of views, and that may be GPU-accelerated for on-demand performance on mobile platforms.

According to various embodiments, backlighting of an electronic display may employ a multibeam diffraction grating to diffractively couple light (e.g., of different colors), or more generally may employ a multibeam element to scatter light out of a light guide and to direct the coupled-out, scattered-out or emitted light in different principle angular directions that correspond to a viewing direction or a plurality of viewing directions of an electronic display. In some examples or embodiments, the light beams having the different principal angular directions (also referred to as 'the differently directed light beams') and, in some embodiments having the different colors, may be employed to display three-dimensional (3D) information as a multiview image. For example, the differently directed, different color light beams may be modulated and serve as pixels of a 'glasses free' 3D or multiview electronic display.

Herein a 'two-dimensional display' or '2D display' is defined as a display configured to provide a view of an image that is substantially the same regardless of a direction from which the image is viewed (i.e., within a predefined viewing angle or range of the 2D display). A conventional liquid crystal display (LCD) found in many smart phones and computer monitors are examples of 2D displays. In contrast herein, a 'multiview display' is defined as an electronic display or display system configured to provide different views of a multiview image in or from different view directions. In particular, the different views may represent different perspective views of a scene or object of the multiview image. Uses of unilateral backlighting and unilateral multiview displays described herein include, but are not limited to, mobile telephones (e.g., smart phones), watches, tablet computers, mobile computers (e.g., laptop computers), personal computers and computer monitors, automobile display consoles, cameras displays, and various other mobile as well as substantially non-mobile display applications and devices.

Figure 1A:
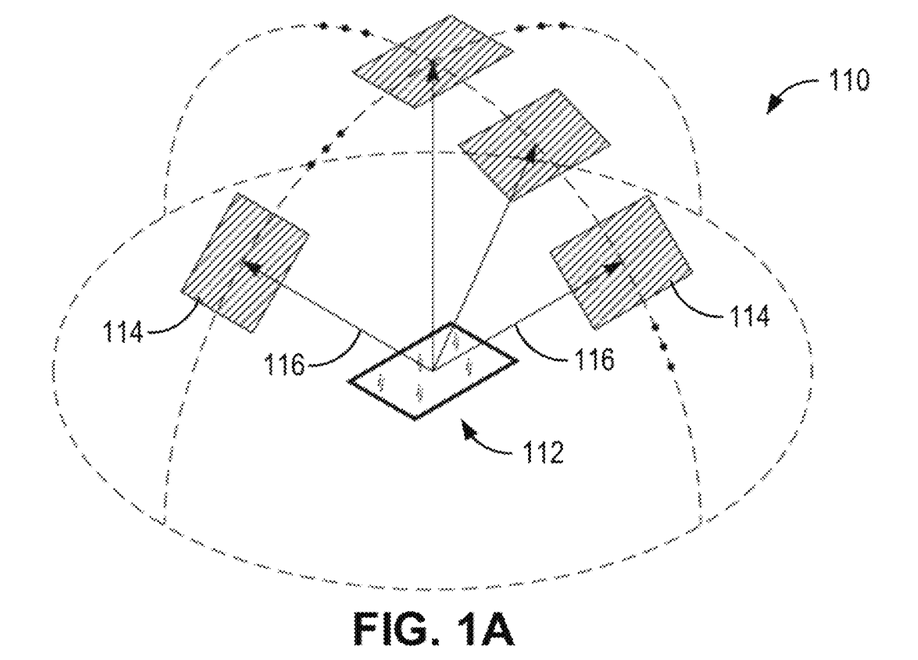
FIG. 1A illustrates a perspective view of a multiview display in an example, according to an embodiment consistent with the principles described herein.

FIG. 1A illustrates a perspective view of a multiview display 110 in an example, according to an embodiment consistent with the principles described herein. As illustrated in FIG. 1A, the multiview display 100 comprises a screen 112 to display a multiview image to be viewed. The screen 112 may be a display screen of a telephone (e.g., mobile telephone, smart phone, etc.), a tablet computer, a laptop computer, a computer monitor of a desktop computer, a camera display, or an electronic display of substantially any other device, for example.

The multiview display 100 provides different views 114 of the multiview image in different view directions 116 relative to the screen 112. The view directions 116 are illustrated as arrows extending from the screen 112 in various different principal angular directions; the different views 114 are illustrated as shaded polygonal boxes at the termination of the arrows (i.e., depicting the view directions 116); and only four views 114 and four view directions 116 are illustrated, all by way of example and not limitation. Note that while the different views 114 are illustrated in FIG. 1A as being above the screen, the views 114 actually appear on or in a vicinity of the screen 112 when the multiview image is displayed on the multiview display 110. Depicting the views 114 above the screen 112 is only for simplicity of illustration and is meant to represent viewing the multiview display 110 from a respective one of the view directions 116 corresponding to a particular view 114. A 2D display may be substantially similar to the multiview display 110, except that the 2D Display is generally configured to provide a single view (e.g., one view of the multiple different views 114) of a displayed image as opposed to the different views 114 of the multiview image provided by the multiview display 100.

A view direction or equivalently a light beam having a direction corresponding to a view direction of a multiview display generally has a principal angular direction given by angular components {θ, ϕ}, by definition herein. The angular component θ is referred to herein as the 'elevation component' or 'elevation angle' of the light beam. The angular component ϕ is referred to as the 'azimuth component' or 'azimuth angle' of the light beam. By definition, the elevation angle θ is an angle in a vertical plane (e.g., perpendicular to a plane of the multiview display screen) while the azimuth angle ϕ is an angle in a horizontal plane (e.g., parallel to the multiview display screen plane).

Figure 1B:
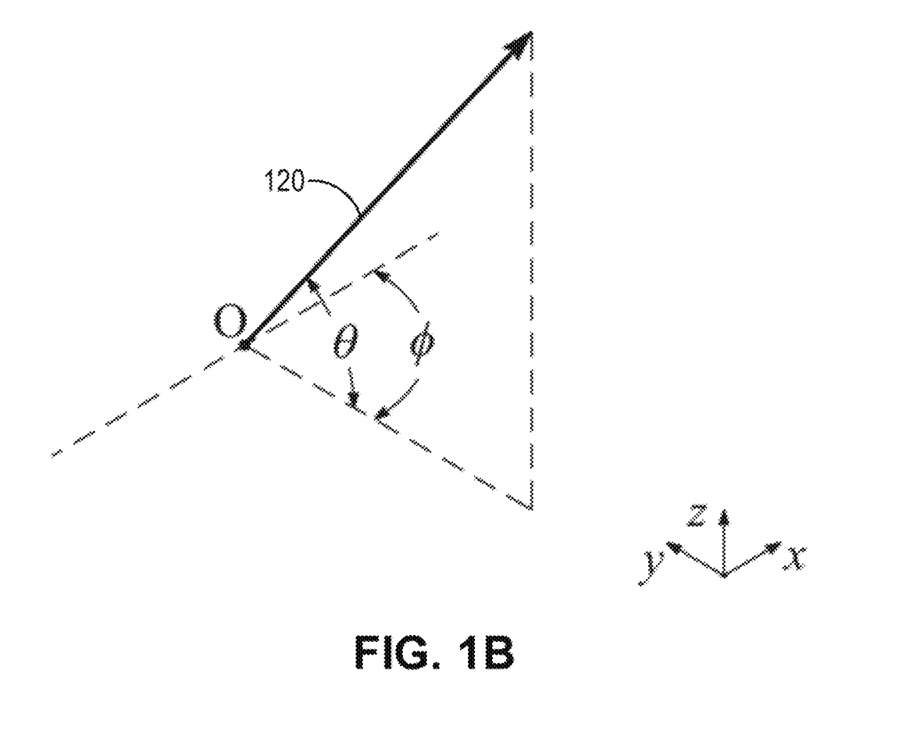
FIG. 1B illustrates a graphical representation of angular components of a light beam having a particular principal angular direction corresponding to a view direction of a multiview display in an example, according to an embodiment consistent with the principles described herein.

FIG. 1B illustrates a graphical representation of the angular components {θ, ϕ} of a light beam 120 having a particular principal angular direction corresponding to a view direction (e.g., view direction 116 in FIG. 1A) of a multiview display in an example, according to an embodiment consistent with the principles described herein. In addition, the light beam 120 is emitted or emanates from a particular point, by definition herein. That is, by definition, the light beam 120 has a central ray associated with a particular point of origin within the multiview display. FIG. 1B also illustrates the light beam (or view direction) point of origin O.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various examples described herein, a diffraction grating (e.g., a diffraction grating of a multibeam element, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n\sin\theta_i - \frac{m\lambda}{d}\right) \quad (1)$$

where λ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer. A diffraction angle $\theta_m$ of a light beam produced by the diffraction grating may be given by equation (1) where the diffraction order is positive (e.g., m>0). For example, first-order diffraction is provided when the diffraction order m is equal to one (i.e., m=1).

Herein, the term 'multiview' or equivalently 'multi-view' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays may include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of sub-pixels representing 'view' pixels in each of a similar plurality of different views of a multiview display. In particular, a multiview pixel may have an individual sub-pixel corresponding to or representing a view pixel in each of the different views of the multiview image. Moreover, the sub-pixels of the multiview pixel are so-called 'directional pixels' in that each of the sub-pixels is associated with a predetermined view direction of a corresponding one of the different views, by definition herein. Further, according to various examples and embodiments, the different view pixels represented by the subpixels of a multiview pixel may have equivalent or at least substantially similar locations or coordinates in each of the different views. For example, a first multiview pixel may have individual sub-pixels corresponding to view pixels located at $\{x_1, y_1\}$ in each of the different views of a multiview image, while a second multiview pixel may have individual sub-pixels corresponding to view pixels located at $\{x_2, y_2\}$ in each of the different views, and so on.

Herein, a 'multiview image' is defined as a plurality of images (i.e., greater than three images) wherein each image of the plurality represents a different view corresponding to a different view direction of the multiview image. As such, the multiview image is a collection of images (e.g., two-dimensional images) which, when display on a multiview display, may facilitate a perception of depth and thus appear to be an image of a 3D scene to a viewer, for example.

Embodiments consistent with the principles described herein may be implemented using a variety of devices and circuits including, but not limited to, one or more of integrated circuits (ICs), very large scale integrated (VLSI) circuits, application specific integrated circuits (ASIC), field programmable gate arrays (FPGAs), digital signal processors (DSPs), graphical processor unit (GPU), and the like, firmware, software (such as a program module or a set of instructions), and a combination of two or more of the above. For example, an embodiment or elements thereof may be implemented as circuit elements within an ASIC or a VLSI circuit. Implementations that employ an ASIC or a VLSI circuit are examples of hardware-based circuit implementations.

In another example, an embodiment may be implemented as software using a computer programming language (e.g., C/C++) that is executed in an operating environment or a software-based modeling environment (e.g., MATLAB®, MathWorks, Inc., Natick, MA) that is further executed by a computer (e.g., stored in memory and executed by a processor or a graphics processor of a general purpose computer). Note that one or more computer programs or software may constitute a computer-program mechanism, and the programming language may be compiled or interpreted, e.g., configurable or configured (which may be used interchangeably in this discussion), to be executed by a processor or a graphics processor of a computer.

In yet another example, a block, a module or an element of an apparatus, device or system (e.g., image processor, camera, etc.) described herein may be implemented using actual or physical circuitry (e.g., as an IC or an ASIC), while another block, module or element may be implemented in software or firmware. In particular, according to the definitions herein, some embodiments may be implemented using a substantially hardware-based circuit approach or device (e.g., ICs, VLSI, ASIC, FPGA, DSP, firmware, etc.), while other embodiments may also be implemented as software or firmware using a computer processor or a graphics processor to execute the software, or as a combination of software or firmware and hardware-based circuitry, for example.

Further, as used herein, the article 'a' is intended to have its ordinary meaning in the patent arts, namely 'one or more'. For example, 'a multiview display' means one or more multiview display and as such, 'the multiview display' means 'the multiview display(s)' herein. Also, any reference herein to 'top,' 'bottom,' 'upper,' 'lower,' 'up,' 'down,' 'front,' 'back,' 'first,' 'second,' 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 2:
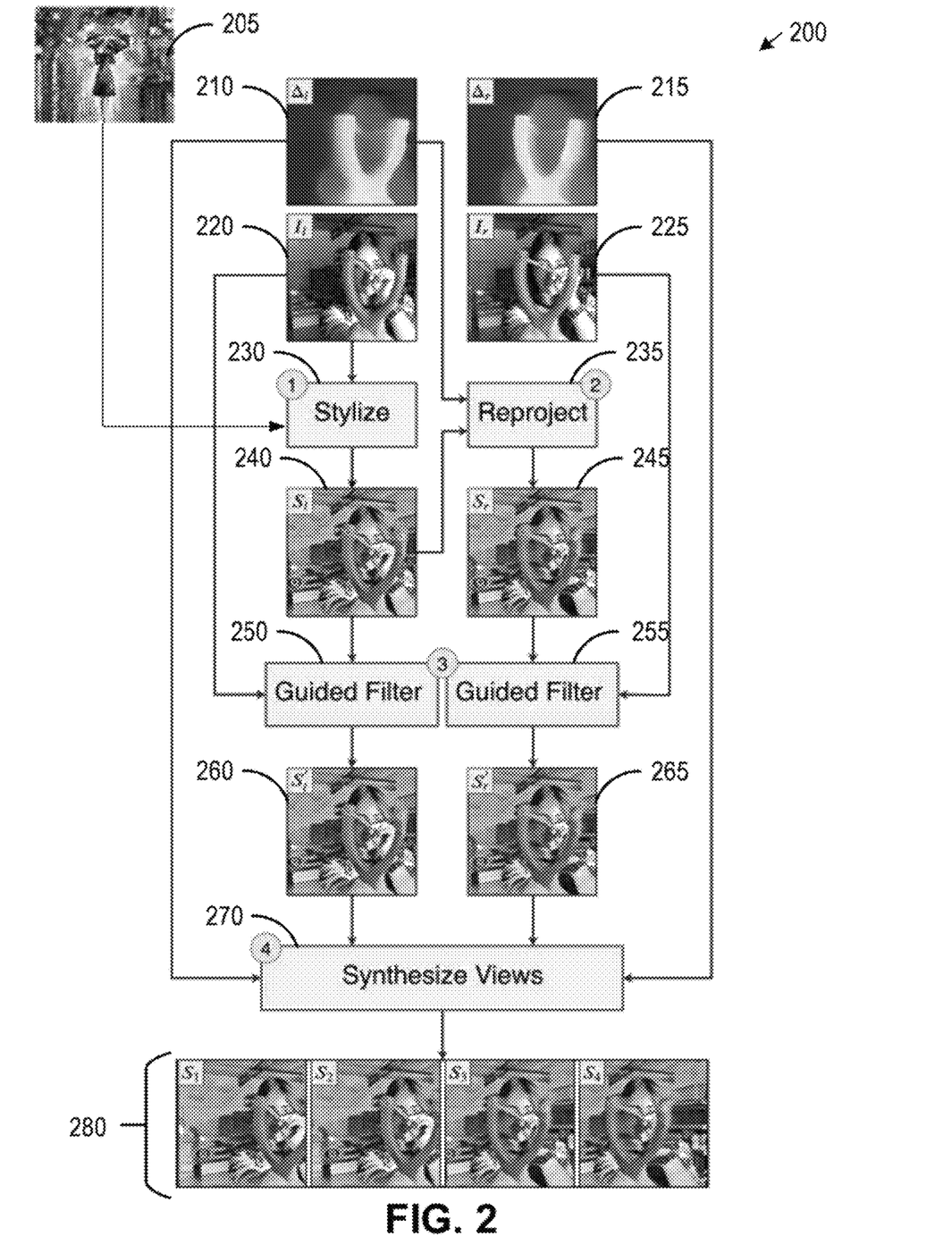
FIG. 2 illustrates a flowchart of a multiview style transfer method in an example, according to an embodiment consistent with the principles described herein.

FIG. 2 illustrates a flowchart of a multiview style transfer method 200 in an example, according to an embodiment consistent with the principles described herein. As illustrated in FIG. 2, an example method 200 for stylizing multiview images includes receiving style information and input image information and synthesizing, or providing, multiple output images consistent with the received style information. For example, the method 200 includes receiving a style guide $G_s$ 205, left disparity map $\Delta_l$ 210, right disparity map $\Delta_r$ 215, left stereo input view $I_l$ 220, and right stereo input view $I_r$ 225. The method 200 is described with respect to left and right images, however a corresponding method may be applied to right and left images, respectively.

In an example, left stereo input view $I_l$ 220 and right stereo input view $I_r$ 225 may be provided with corresponding left disparity map $\Delta_l$ 210 and right disparity map $\Delta_r$ 215. In another example, the disparity maps 210 and 215 may be estimated based on left stereo input view $I_l$ 220 and right stereo input view $I_r$ 225. In an example, disparity maps 210 and 215 are estimated based on a neural network trained on a plurality of input stereo images.

In the example of FIG. 2, method 200 includes applying a style transfer network to stylize 230 left stereo input view $I_l$ 220 based on style guide $G_s$ 205, which generates a stylized left image $S_l$ 240. The application of the style transfer network to stylize 230 only one of the input stereo views provides various advantages. Stylization 230 of one of the two stereo images provides stylistic consistency between multiple views, which reduces or eliminates effects caused by the sensitivity of style transfer networks to small changes in the input.

Figure 4:
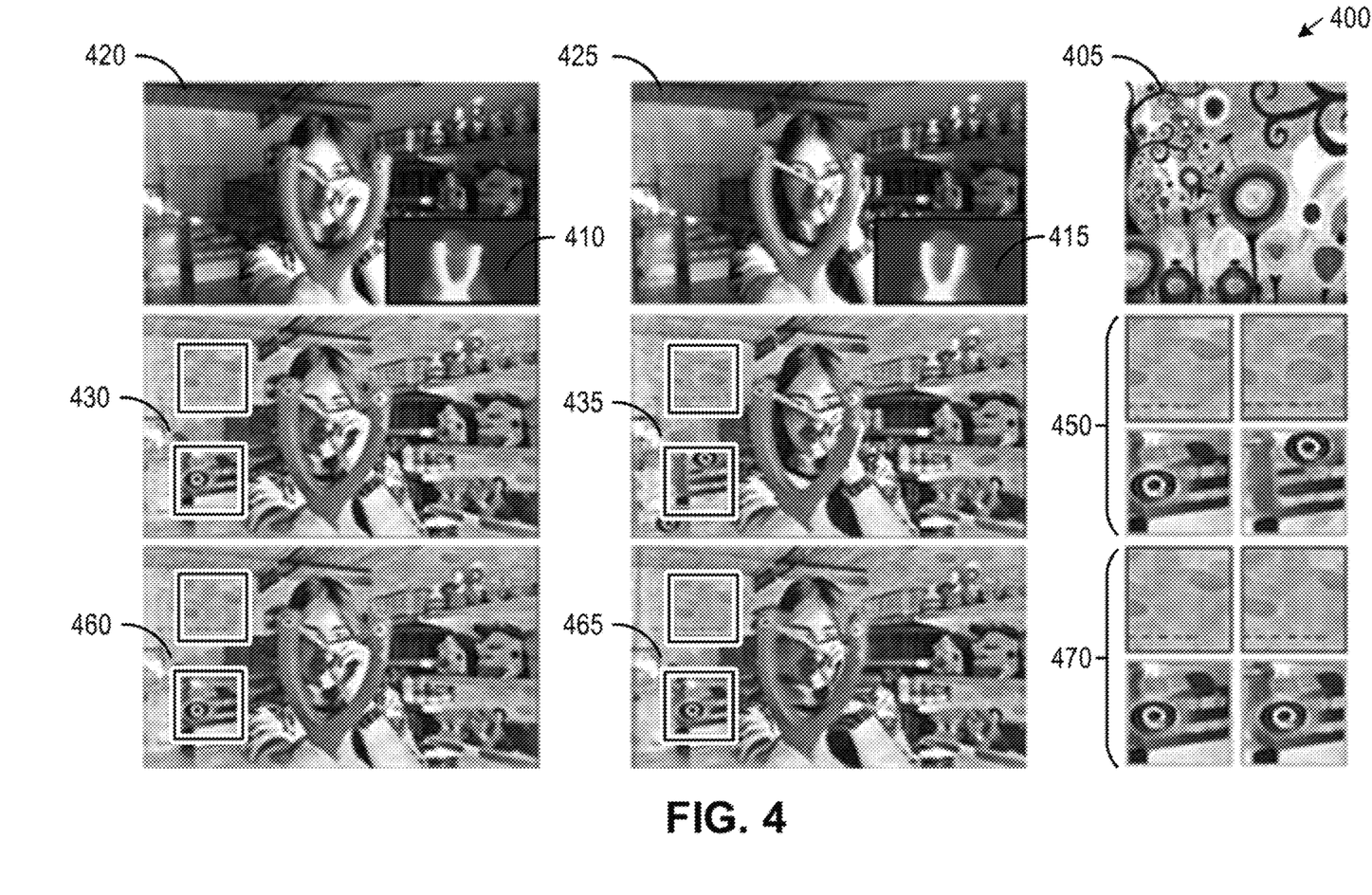
FIG. 4 illustrates a flowchart of a multiview style transfer output array in an example, according to an embodiment consistent with the principles described herein.

For example, a problem in stylizing each view individually can include a parallax effect between stereo views, such as may cause visual differences, or may result in stylized features changing location or appearance between stylized stereo images, such as shown in FIG. 4 enlarged images 450. Such inconsistencies can cause viewer fatigue, for example, when viewing 3D content on a multiview display. A solution to the problem can include using stylization 230 of one of the two stereo images. The solution can further provide a reduced computational cost, such as for multiview display devices on portable electronic devices (e.g., smartphones). That is, stylizing once and synthesizing many output frames or output views is considerably more computationally efficient than stylizing every output frame or output view individually. Another advantage of the present solution can include that the stylization 230 of one of the two stereo images can provide improved compatibility with various style transfer networks. For example, the solution can help reduce or eliminate modifications and retraining specifically for multiview rendering, and thereby method 200 may provide improved functionality with various style transfer networks, and may provide improved quality and performance.

The example of method 200 includes a re-projection 235 of first stylized left image $S_l$ 240 based on left disparity map $\Delta_l$ 210 to generate stylized right image $S_r$ 245. In an example, stylized left image $S_l$ 240 is re-projected to generate stylized right image $S_r$ 245 at the same viewpoint as right stereo input view $I_r$ 225, such as using a view synthesis module. In an example, the re-projection 235 may be performed on one or more of a central processing unit (CPU) and a graphical processing unit (GPU). In an example, re-projection 235 includes one or more of forward warping, a depth test, and an in-painting technique to sample nearby regions such as to fill de-occluded regions. Forward warping is an image distortion process that applies a transformation to a source image. Pixels from the source image may be processed in a scanline order and the results are projected onto a target image. A depth test is a process where fragments of an image that are processed or to be processed by a shader have depth values that are tested with respect to a depth of a sample to which it is being written. Fragments are discarded when the test fails. And a depth buffer is updated with the fragment's output depth when the test passes. In-painting refers to filling in missing or unknown regions of an image. Some techniques involve predicting pixel vales based on nearby pixels or reflecting nearby pixels onto an unknown or missing region. Missing or unknown regions of an image may result from scene de-occlusion, which refers to a scene object that is partially covered by another scene object. In this respect, re-projection may involve image processing techniques to construct a new perspective of a scene from an original perspective. The resultant generated stylized right image $S_r$ 245 is thus a re-projection of the stylized left view to the right viewpoint, where the style features of stylized right image $S_r$ 245 are transported to their corresponding positions in the generated stylized right image $S_r$ 245.

The example of method 200 includes applying guided filter module 250 to stylized left image $S_l$ 240 to generate left filtered stylized view $S_l'$ 260, and similarly applying guided filter module 255 to stylized right image $S_r$ 245 to generate right filtered stylized view $S_r'$ 265. In an example, the guided filter module 250 includes a filter configured for refining stylized left image $S_l$ 240 and stylized right image $S_r$ 245 using edge-aware guided filtering. The edge-aware guided filtering can be based on detected edges in left stereo input view $I_l$ 220 and right stereo input view $I_r$ 225. For example, when viewing images on a multiview display, a quality of edge placements can enhance or detract from the 3D perception experience, however the style transfer process can, in some examples, degrade the edges of objects in the 3D scene. By applying guided filter module 250 to the stylized images 240 and 245 using their corresponding un-stylized views 220 and 225 as guides, the edges of original 3D objects can be reinforced while reducing the stylization of the edges, thus resulting in a more immersive or robust 3D experience. An example of the application of guided filter module 250 is shown in FIG. 3, described below.

The method 200 includes synthesizing 270 left filtered stylized view $S_l'$ 260 and right filtered stylized view $S_r'$ 265 to generate multiple stylized images $S_1$, $S_2$, $S_3$, and $S_4$ 280 corresponding to respective different viewpoints. In an example, synthesizing 270 includes re-projecting left filtered stylized view $S_l'$ 260 and right filtered stylized view $S_r'$ 265 to multiple viewpoints $x_1, x_2, \ldots, x_n$, such as can be based on left disparity map $\Delta_l$ 210 and right disparity map $\Delta_r$ 215. This re-projection is similar to re-projection 235 as applied to multiple viewpoints $x_1, x_2, \ldots, x_n$. In an example, each of the viewpoint stylized images $S_1$, $S_2$, $S_3$, and $S_4$ 280 is based on a re-projection of left filtered stylized view $S_l'$ 260 and right filtered stylized view $S_r'$ 265 to each of multiple viewpoints $x_1, x_2, \ldots, x_n$, and blending based on proximity of the viewpoint to the left and right viewpoints corresponding with left stereo input view $I_l$ 220 and right stereo input view $I_r$ 225.

Figure 3:
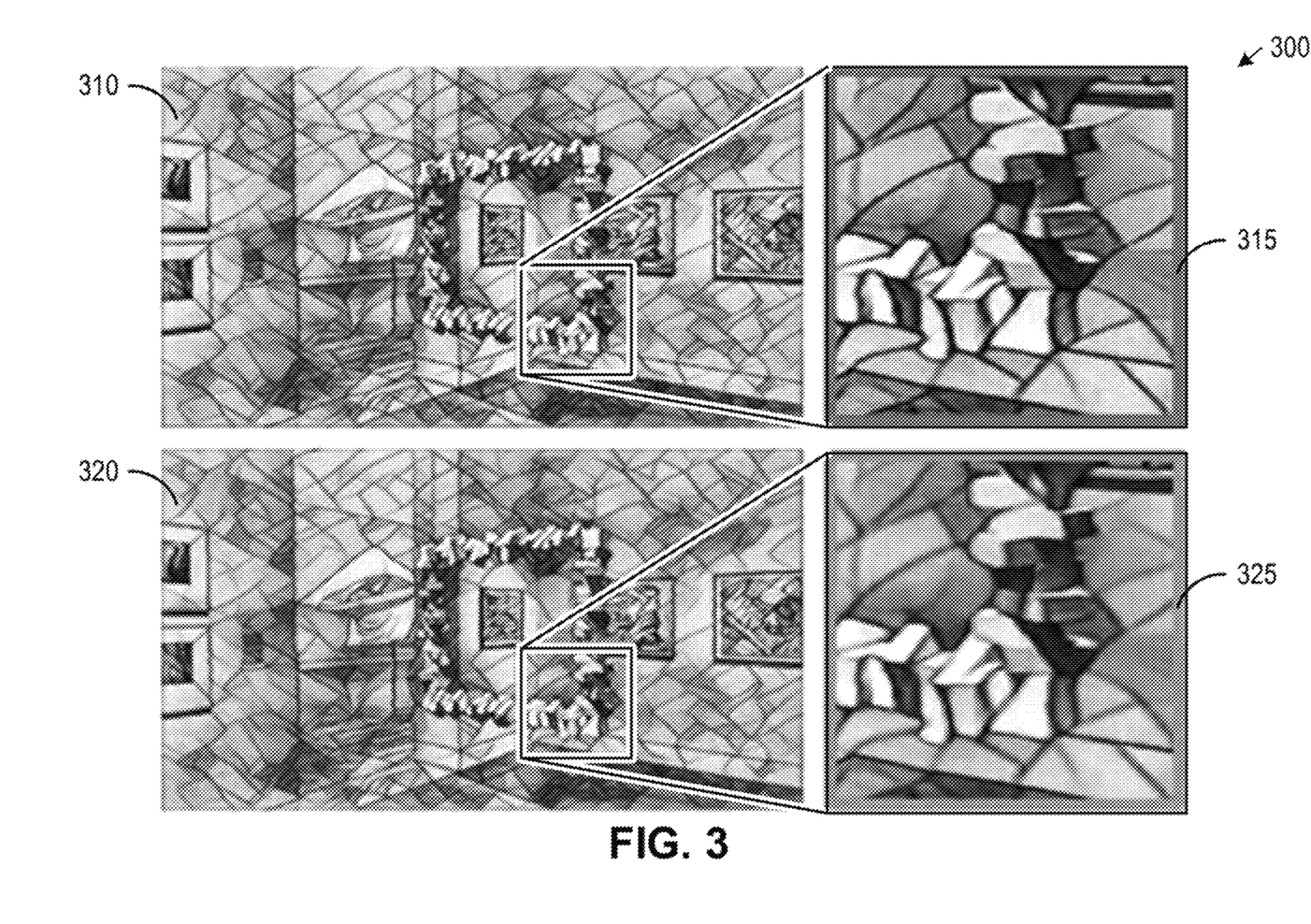
FIG. 3 illustrates a guided filter application in an example, according to an embodiment consistent with the principles described herein.

FIG. 3 illustrates a guided filter application 300 in an example, according to an embodiment consistent with the principles described herein. FIG. 3 shows an example of a stylized image S before application of a guided filter 310 and after application of the guided filter 320. Enlarged pre-filter image 315 and enlarged post-filter image 325 show that applying a guided filter increases the consistency with the edges in the original 3D scene while reducing the effect of edges introduced by style transfer.

FIG. 4 illustrates a flowchart of a multiview style transfer output array 400 in an example, according to an embodiment consistent with the principles described herein. As illustrated in FIG. 4, a style guide 405 is applied to a left disparity map 410, a right disparity map 415, a left stereo input view 420, and a right stereo input view 425. A first example stylized image pair 430 and 435 corresponds to images that have been stylized and projected, but without application of a guided edge filter. As can be seen in images 450 enlarged from the first example stylized image pair 430 and 435, inconsistent features and other inconsistent styling may result from a pair of stereo images that have been stylized and projected without application of a guided edge filter. These inconsistencies may reduce the viewer's ability to focus on stereoscopic images, thereby increasing 3D viewing fatigue. A second example stylized image pair 460 and 465 corresponds to images that have been stylized, projected, and filtered using a guided edge filter. As can be seen in images 470 enlarged from the second example stylized image pair 460 and 465, the consistency of features and styling is improved by the application of a guided edge filter. This improved consistency improves user focus and comfort in viewing multiple images on a multiview display.

The present systems and methods for a multiview style transfer MST provide various advantages over other solutions. Table 1 shows a mean runtime comparison in some embodiments for rendering a stylized multiview image with 4 views (e.g., viewpoints), 8 views, and 16 views, using each of six different methods or techniques:

TABLE 1

Multiview Style Transfer Output Runtime Comparison

| Method | Time taken (ms) | | |
|---|---|---|---|
| | 4 Views | 8 Views | 16 Views |
| Baseline CPU | 8352 | 16682 | 33358 |
| Baseline GPU | 1405 | 2832 | 5768 |
| Approach A | 843 | 849 | 858 |
| Approach B | 746 | 995 | 1213 |
| MST CPU | 2311 | 2394 | 2576 |
| MST GPU | 561 | 567 | 576 |

Table 1 compares baseline CPU and GPU solutions, Approaches A and B, and the present multiview style transfer (MST) CPU and GPU solutions. The baseline CPU and baseline GPU solutions naively apply neural style transfer to each of the synthesized views individually. As shown in Table 1, the present MST CPU and MST GPU scale linearly with a number of perspective viewpoints. This provides computational efficiency improvements over baseline CPU and baseline GPU solutions, which do not scale linearly. The present MST CPU and MST GPU further produce style-consistent views and thus improved computational efficiency.

The present MST CPU and MST GPU provide improvements over Approach A. Approach A includes applying a neural style-transfer to each of the stereoscopic input views, then performing a novel view synthesis using the stylized pair and the original disparity maps as inputs. While Approach A runs faster than baseline CPU and baseline GPU, the rendered views produce undesirable ghosting artifacts and an overall inconsistent styling between the stereoscopic pair, which can lead to viewing fatigue.

Approach B seeks to improve the style inconsistency of the output images over Approach A. Approach B includes applying a neural style only to the input left image to create the stylized left image and then synthesizing novel views only from this stylized left image. Approach B further includes performing view synthesis simultaneously using both the original naturalistic left and right images, where this naturalistic multiview image is used as a guide for a guided filter pass on the stylized multiview image. The resulting multiview image is sharpened to reduce blurring artifacts. This method produces consistently styled views with relatively sharp edges, however Approach B limits the depth effect due to using only the left image for the styled novel view synthesis. Additionally, Approach B results in a reduction of lined-up edges in the guided filtering step, and ghosting artifacts are produced around the edges in the output views.

The multiview style transfer method 200 provides improvements over baseline, Approach A, and Approach B, while providing improved computational efficiency. In particular, multiview style transfer method 200 provides improved multiview consistent stylized images with on-demand performance, including when GPU-accelerated on mobile devices.

Figure 5A:
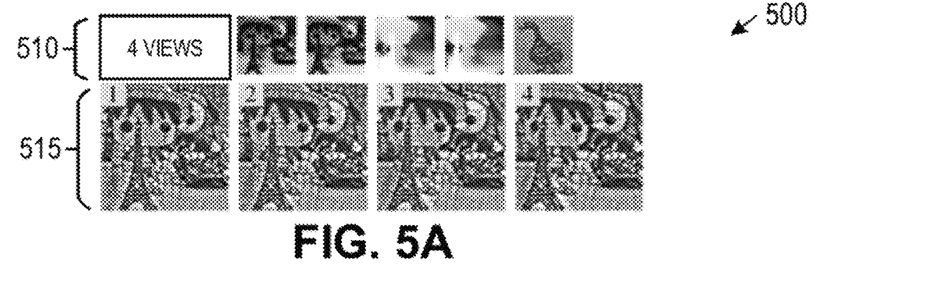
FIGS. 5A-5C illustrate multiview style transfer method results in an example, according to an embodiment consistent with the principles described herein.
Figure 5B:
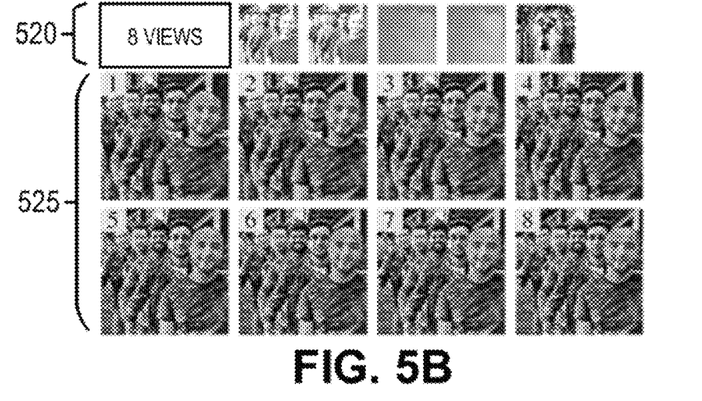
Figure 5C:
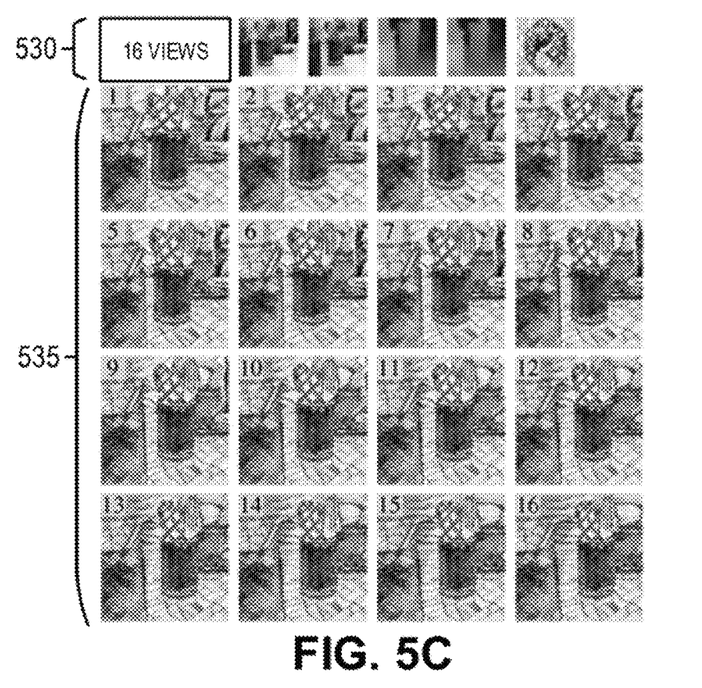

FIGS. 5A-5C illustrate multiview style transfer method results 500 in various examples, according to an embodiment consistent with the principles described herein. FIG. 5A illustrates a 4-view example that takes inputs 510 such as original stereo pairs, disparity maps, and style guide, and generates outputs 515. Similarly, FIG. 5B illustrates an 8-view example that takes inputs 520 and generates outputs 525, and FIG. 5C illustrates a 16-view example that takes inputs 530 and generates outputs 535. As can be seen in FIGS. 5A-5C, the present multiview style transfer method 200 results in consistent stylization of objects within each synthesized image regardless of object position, rotation, or occlusion. The different views in the examples of FIGS. 5A-5C can correspond to respective different views or view perspectives in a multiview display.

Figure 6A:
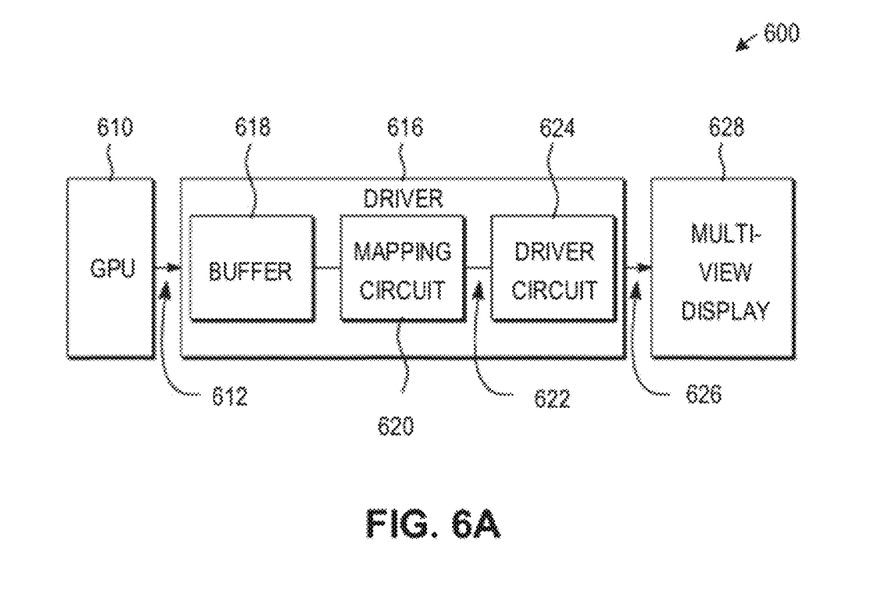
FIGS. 6A-6B illustrate a multiview style transfer device in various examples, according to an embodiment consistent with the principles described herein.
Figure 6B:
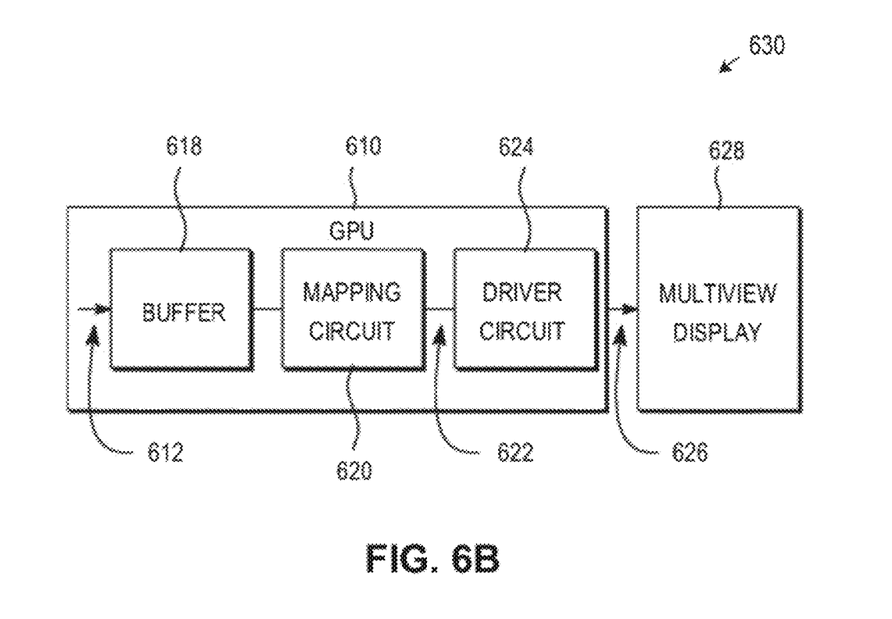

FIGS. 6A-6B illustrate a multiview style transfer device 600 in various examples, according to an embodiment consistent with the principles described herein. FIG. 6A illustrates a block diagram of an electronic device 600 that includes multiview display 628 in an example, according to an embodiment of the principles described herein. As illustrated, the electronic device 600 comprises a graphics processing unit (GPU) 610. The graphics processing unit 610 is configured to generate a stylized multiview image 612 with separate 3D viewpoints (such as the stylized multiview image described previously).

After receiving the stylized multiview image 612, a driver 616 may store the stylized multiview image 612 in a buffer 618. Note that the buffer 618 may be able to store the entire stylized multiview image 612 with the 3D views, such as a full frame of 3D video. Then, a mapping circuit 620 (such as control or routing logic, and more generally a mapping or a transformation block) transforms the stylized multiview image 612 into a composite image 622. Next, a driver circuit 624 drives or applies pixel drive signals 626 to the multiview display 628 based on the composite image 622. In some embodiments, the stylized multiview image 612 has or is compatible with an image file having one of multiple different formats.

Instead of a separate driver 616, in some embodiments some or all of the functionality in the driver 616 is included in the graphics processing unit. This is shown in FIG. 6B, which illustrates a block diagram of an electronic device 630 that includes the multiview display 628 in an example, according to another embodiment of the principles described herein. In particular, in FIG. 6B, a graphics processing unit 610 includes components of the driver 616.

While FIGS. 6A and 6B illustrate the image-processing technique in electronic devices that include the multiview display 628, in some embodiments the image-processing technique is implemented in one or more components in one of the electronic devices 600 and 630, such as one or more components in the multiview display 628, which may be provide separately from or in conjunction with a remainder of the multiview display 628 or one of the electronic devices 600 and 630.

In some embodiments, electronic devices 600 and 630 may include processing circuitry such as, for example, a central processing unit (CPU) that is configured to execute instructions stored in memory. The instructions may be part of an application that is supported by an operating system. The instructions may be part of a software program routine that is executed by a CPU, GPU, or a combination thereof. For example, view synthesis may be implemented as software executed by a CPU or GPU while the guided filter is implemented as software that is executed by the CPU.

Various aspects of the present disclosure can help provide a solution to the stylization problems identified herein. For instance, Example 1 can include a multiview style transfer system comprising: processing circuitry; and a memory that includes, instructions, the instructions, when executed by the processing circuitry, cause the processing circuitry to: receive a first image representative of a first perspective of a scene, a first disparity map corresponding to the first image, a second image representative of a second perspective of the scene, and a second disparity map corresponding to the second image; generate a first stylized image, the first stylized image representative of a style transfer model applied to the first image; generate a stylized shifted image based on the first stylized image and the first disparity map, the stylized shifted image including a first shift of the first stylized image to the second perspective; and generate a second stylized image based on a guided filter of the stylized shifted image and the second image, the guided filter to process edge characteristics in the second stylized image based on the second image. A shifted image or shift image is an image that has a perspective view that is shifted from an original image. Shifting refers to shifting a view of an image to generate a new image. Shifting may be implemented using a re-projection technique. To generate a shift image from an original image, various regions of the original image may be stretched, relocated, or warped.

In Example 2, the subject matter of Example 1 includes, a multiview display, wherein the instructions further cause the processing circuitry to: generate a first stylized image based on the stylized shifted image and the first disparity map; generate a second stylized image based on the second stylized image and the second disparity map, wherein the first stylized image and the second stylized image are configured for concurrent use by the multiview display; and display the first stylized image and the second stylized image on the multiview display.

In Example 3, the subject matter of Example 2 includes, the instructions further causing the processing circuitry to: synthesize a plurality of stylized perspective views based on first stylized image and the second stylized image; and display the plurality of stylized perspective views on the multiview display.

In Example 4, the subject matter of Examples 1-3 includes, the instructions further causing the processing circuitry to generate a second filtered image based on application of a second guided filter to the second stylized image, wherein the generation of the second stylized image is further based on the second filtered image.

In Example 5, the subject matter of Example 4 includes, the instructions further causing the processing circuitry to generate a first filtered image based on application of a first guided filter to the first stylized image, wherein the generation of the first stylized image is further based on the first filtered image.

In Example 6, the subject matter of Example 5 includes, wherein: the first guided filter includes a first guided sharpening filter, the first guided sharpening filter to sharpen the first stylized image based on a first plurality of edges within the first image; and the second guided filter includes a second guided sharpening filter, the second guided sharpening filter to sharpen the second stylized image based on a second plurality of edges within the second image. In some embodiments, a guided sharpening filter may be used to sharpen detected edges by using a high pass filter that remove low frequencies.

In Example 7, the subject matter of Examples 1-6 includes, the instructions further causing the processing circuitry to generate the first stylized image based on the first image and the style transfer model.

In Example 8, the subject matter of Example 7 includes, wherein the style transfer model includes a style transfer neural network trained via machine learning on a plurality of target style images.

In Example 9, the subject matter of Examples 7-8 includes, the instructions further causing the processing circuitry to: receive a target style image; and identify a target style based on application of a neural style transfer (NST) algorithm to the target style image; and generate the style transfer model based on the target style.

In Example 10, the subject matter of Examples 1-9 includes, the instructions further causing the processing circuitry to: generate the first disparity map based on the first image and the second image, the first disparity map representing differences in horizontal coordinates of a first plurality of image points in the first image relative to a second plurality of image points in the second image; and generate the second disparity map based on the first image and the second image, the second disparity map representing differences in horizontal coordinates of the second plurality of image points in the second image relative to the first plurality of image points in the first image. For example, disparity map indicates an apparent pixel difference between views of multiview image. In this respect, a disparity map controls the apparent disparity of rendered pixels by specifying where pixels should be rendered on the multiview display. When disparity is about zero, the pixels representing an object appear to the viewer at the same location across different views. When rendered on a multiview display, pixels having about zero disparity appear to viewer as located on the screen display while pixels having non-zero disparity appear either in front of or behind the screen of the display.

The differences in horizontal coordinates across different views result in differences in pixel locations of the same object that is viewed from different perspectives giving rise to disparity. In some embodiments, a disparity map may indicate vertical disparity, horizontal disparity, or both. Thus, the difference between corresponding pixels of different views may be in either the vertical direction, horizontal direction, or both.

In Example 11, the subject matter of Examples 1-10 includes, the instructions further causing the processing circuitry to: generate a first extrapolated image based on the first stylized image and the first disparity map, the first extrapolated image representing a first synthesized viewpoint extrapolated to a third viewpoint based on the first perspective of the scene associated with the first image; generate a second extrapolated image based on the second stylized image and the second disparity map, the second extrapolated image representing a second synthesized viewpoint extrapolated to a fourth viewpoint based on the second perspective of the scene associated with the second image; and display the first extrapolated image and the second extrapolated image on the multiview display. View synthesis may involve artificially predicting, extrapolating, or interpolating new views from one or more original views using computer vision techniques, forward warping, a depth test, in-painting techniques or any combination thereof.

In Example 12, the subject matter of Examples 1-11 includes, the instructions further causing the processing circuitry to: generate a first stylized viewpoint image based on re-projecting the first stylized image from a first desired output viewpoint; generate a second stylized viewpoint image based on re-projecting the second stylized image from a second desired output viewpoint; and display the first stylized viewpoint image and the second stylized viewpoint image on the multiview display. The desired output viewpoint corresponds to a principle angular direction of a view that is produced by the multiview display.

In Example 13, the subject matter of Example 12 includes, wherein: the first desired output viewpoint is based on a first device viewpoint associated with a device multiview display; and the second desired output viewpoint is based on a second device viewpoint associated with a device multiview display.

In Example 14, the subject matter of Examples 12-13 includes, the instructions further causing the processing circuitry to: generate a third stylized viewpoint image based on re-projecting the third stylized image from a third desired output viewpoint; generate a fourth stylized viewpoint image based on re-projecting the fourth stylized image from a fourth desired output viewpoint; and display the third stylized viewpoint image and the fourth stylized viewpoint image on the multiview display.

Example 15 is a multiview style transfer method comprising: receiving a first image representative of a first perspective of a scene, a first disparity map corresponding to the first image, a second image representative of a second perspective of the scene, and a second disparity map corresponding to the second image; generating a first stylized image, the first stylized image representative of a style transfer model applied to the first image; generating a stylized shifted image based on the first stylized image and the first disparity map, the stylized shifted image including a first shift of the first stylized image to the second perspective; and generating a second stylized image based on a guided filter of the stylized shifted image and the second image, the guided filter to process edge characteristics in the second stylized image based on the second image.

In Example 16, the subject matter of Example 15 includes, generating a first stylized image based on the stylized shifted image and the first disparity map; and generating a second stylized image based on the second stylized image and the second disparity map, wherein the first stylized image and the second stylized image are configured for concurrent use by a multiview display.

In Example 17, the subject matter of Example 16 includes, synthesizing a plurality of stylized perspective views based on first stylized image and the second stylized image.

In Example 18, the subject matter of Examples 15-17 includes, generating a second filtered image based on application of a second guided filter to the second stylized image, wherein the generation of the second stylized image is further based on the second filtered image.

In Example 19, the subject matter of Example 18 includes, generating a first filtered image based on application of a first guided filter to the first stylized image, wherein the generation of the first stylized image is further based on the first filtered image.

In Example 20, the subject matter of Example 19 includes, wherein: the first guided filter includes a first guided sharpening filter, the first guided sharpening filter to sharpen the first stylized image based on a first plurality of edges within the first image; and the second guided filter includes a second guided sharpening filter, the second guided sharpening filter to sharpen the second stylized image based on a second plurality of edges within the second image.

In Example 21, the subject matter of Examples 15-20 includes, generating the first stylized image based on the first image and the style transfer model.

In Example 22, the subject matter of Example 21 includes, wherein the style transfer model includes a style transfer neural network trained via machine learning on a plurality of target style images.

In Example 23, the subject matter of Examples 21-22 includes, receiving a target style image; and identifying a target style based on application of a neural style transfer (NST) algorithm to the target style image; and generating the style transfer model based on the target style.

In Example 24, the subject matter of Examples 15-23 includes, generating the first disparity map based on the first image and the second image, the first disparity map representing differences in horizontal coordinates of a first plurality of image points in the first image relative to a second plurality of image points in the second image; and generating the second disparity map based on the first image and the second image, the second disparity map representing differences in horizontal coordinates of the second plurality of image points in the second image relative to the first plurality of image points in the first image.

In Example 25, the subject matter of Examples 15-24 includes, generating a first extrapolated image based on the first stylized image and the first disparity map, the first extrapolated image representing a first synthesized viewpoint extrapolated to a third viewpoint based on the first perspective of the scene associated with the first image; and generating a second extrapolated image based on the second stylized image and the second disparity map, the second extrapolated image representing a second synthesized viewpoint extrapolated to a fourth viewpoint based on the second perspective of the scene associated with the second image.

In Example 26, the subject matter of Examples 15-25 includes, generating a first stylized viewpoint image based on re-projecting the first stylized image from a first desired output viewpoint; and generating a second stylized viewpoint image based on re-projecting the second stylized image from a second desired output viewpoint.

In Example 27, the subject matter of Example 26 includes, wherein: the first desired output viewpoint is based on a first device viewpoint associated with a device multiview display; and the second desired output viewpoint is based on a second device viewpoint associated with a device multiview display.

In Example 28, the subject matter of Examples 26-27 includes, generating a third stylized viewpoint image based on re-projecting the third stylized image from a third desired output viewpoint; and generating a fourth stylized viewpoint image based on re-projecting the fourth stylized image from a fourth desired output viewpoint.

Thus, there have been described examples and embodiments of a multiview style transfer system and method to display a first stylized image and a second stylized image on a multiview display. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A multiview style transfer system comprising:
processing circuitry; and
a memory that includes instructions, the instructions, when executed by the processing circuitry, cause the processing circuitry to:
receive a first image representative of a first perspective of a scene, a first disparity map corresponding to the first image, and a second image representative of a second perspective of the scene;
generate a first stylized image representative of a style transfer model applied to the first image;
generate a stylized shifted image based on the first stylized image and the first disparity map, the stylized shifted image including a first shift of the first stylized image to the second perspective; and generate a second stylized image based on a guided filter of the stylized shifted image and the second image, the guided filter to process edge characteristics in the second stylized image based on the second image.

2. The multiview style transfer system of claim 1, further including a multiview display, wherein the instructions further cause the processing circuitry to:
generate the first stylized image based on the first disparity map;
generate the second stylized image based on a second disparity map corresponding to the second image, wherein the first stylized image and the second stylized image are configured to be concurrently rendered by a multiview display; and
display the first stylized image and the second stylized image on the multiview display.

3. The multiview style transfer system of claim 2, wherein the instructions further cause the processing circuitry to:
synthesize a plurality of stylized perspective views based on the first stylized image and the second stylized image; and
display the plurality of stylized perspective views on the multi view display.

4. The multiview style transfer system of claim 2, wherein the instructions further cause the processing circuitry to:
generate a first extrapolated image based on the first stylized image and the first disparity map, the first extrapolated image representing a first synthesized viewpoint extrapolated to a third viewpoint based on the first perspective of the scene associated with the first image;
generate a second extrapolated image based on the second stylized image and the second disparity map, the second extrapolated image representing a second synthesized viewpoint extrapolated to a fourth viewpoint based on the second perspective of the scene associated with the second image; and
display the first extrapolated image and the second extrapolated image on the multiview display.

5. The multiview style transfer system of claim 2, wherein the instructions further cause the processing circuitry to:
generate a first stylized viewpoint image based on re-projecting the first stylized image from a first desired output viewpoint;
generate a second stylized viewpoint image based on re-projecting the second stylized image from a second desired output viewpoint; and
display the first stylized viewpoint image and the second stylized viewpoint image on the multiview display.

6. The multiview style transfer system of claim 5, wherein:
the first desired output viewpoint is based on a first device viewpoint associated with a device multiview display; and
the second desired output viewpoint is based on a second device viewpoint associated with the device multiview display.

7. The multiview style transfer system of claim 5, wherein the instructions further cause the processing circuitry to:
generate a third stylized viewpoint image based on re-projecting a third stylized image from a third desired output viewpoint;
generate a fourth stylized viewpoint image based on re-projecting a fourth stylized image from a fourth desired output viewpoint; and
display the third stylized viewpoint image and the fourth stylized viewpoint image on the multiview display.

8. The multiview style transfer system of claim 1, wherein the instructions further cause the processing circuitry to generate the second stylized image as a second filtered image based on application of a second guided filter to the second stylized image, wherein the generation of the second filtered image is further based on the second image.

9. The multiview style transfer system of claim 8, wherein the instructions further cause the processing circuitry to generate the first stylized image as a first filtered image based on application of a first guided filter to the first stylized image, wherein the generation of the first filtered image is further based on the first image.

10. The multiview style transfer system of claim 9, wherein:
the first guided filter includes a first guided sharpening filter, the first guided sharpening filter to sharpen the first stylized image based on a first plurality of edges within the first image; and
the second guided filter includes a second guided sharpening filter, the second guided sharpening filter to sharpen the second stylized image based on a second plurality of edges within the second image.

11. The multiview style transfer system of claim 1, wherein the instructions further cause the processing circuitry to generate the first stylized image based on the first image and the style transfer model.

12. The multiview style transfer system of claim 11, wherein the style transfer model includes a style transfer neural network trained via machine learning on a plurality of target style images.

13. The multiview style transfer system of claim 11, wherein the instructions further cause the processing circuitry to:
receive a target style image;
identify a target style based on application of a neural style transfer (NST) algorithm to the target style image; and
generate the style transfer model based on the target style.

14. The multiview style transfer system of claim 1, wherein the first disparity map is generated based on the first image and the second image, the first disparity map representing differences in horizontal coordinates of a first plurality of image points in the first image relative to a second plurality of image points in the second image; and
wherein a second disparity map is generated based on the first image and the second image, the second disparity map representing differences in horizontal coordinates of the second plurality of image points in the second image relative to the first plurality of image points in the first image.

15. A multiview style transfer method comprising:
receiving a first image representative of a first perspective of a scene, a first disparity map corresponding to the first image, and a second image representative of a second perspective of the scene;
generating a first stylized image representative of a style transfer model applied to the first image;
generating a stylized shifted image based on the first stylized image and the first disparity map, the stylized shifted image including a first shift of the first stylized image to the second perspective; and
generating a second stylized image based on a guided filter of the stylized shifted image and the second image, the guided filter to process edge characteristics in the second stylized image based on the second image.

16. The multiview style transfer method of claim 15, further comprising:
generating a first stylized image based on the first disparity map; and
generating a second stylized image based on a second disparity map corresponding to the second image, wherein the first stylized image and the second stylized image are configured to be rendered by a multiview display.

17. The multiview style transfer method of claim 16, further comprising synthesizing a plurality of stylized perspective views based on the first stylized image and the second stylized image.

18. The multiview style transfer method of claim 16, further comprising generating the second stylized image as a second filtered image based on application of a second guided filter to the second stylized image, wherein the generation of the second filtered image is further based on the second image.

19. The multiview style transfer method of claim 18, further comprising generating the first stylized image as a first filtered image based on application of a first guided filter to the first stylized image, wherein the generation of the first filtered image is further based on the first image.

20. The multiview style transfer method of claim 19, wherein:
the first guided filter includes a first guided sharpening filter, the first guided sharpening filter to sharpen the first stylized image based on a first plurality of edges within the first image; and
the second guided filter includes a second guided sharpening filter, the second guided sharpening filter to sharpen the second stylized image based on a second plurality of edges within the second image.

21. The multiview style transfer method of claim 16, further comprising:
generating a first extrapolated image based on the first stylized image and the first disparity map, the first extrapolated image representing a first synthesized viewpoint extrapolated to a third viewpoint based on the first perspective of the scene associated with the first image; and
generating a second extrapolated image based on the second stylized image and the second disparity map, the second extrapolated image representing a second synthesized viewpoint extrapolated to a fourth viewpoint based on the second perspective of the scene associated with the second image.

22. The multiview style transfer method of claim 16, further comprising:
generating a first stylized viewpoint image based on re-projecting the first stylized image from a first desired output viewpoint; and
generating a second stylized viewpoint image based on re-projecting the second stylized image from a second desired output viewpoint.

23. The multiview style transfer method of claim 22, wherein:
the first desired output viewpoint is based on a first device viewpoint associated with a device multiview display; and
the second desired output viewpoint is based on a second device viewpoint associated with the device multiview display.

24. The multiview style transfer method of claim 22, further comprising:
generating a third stylized viewpoint image based on re-projecting the third stylized image from a third desired output viewpoint; and
generating a fourth stylized viewpoint image based on re-projecting the fourth stylized image from a fourth desired output viewpoint.

25. The multiview style transfer method of claim 15, further comprising generating the first stylized image based on the first image and the style transfer model.

26. The multiview style transfer method of claim 25, wherein the style transfer model includes a style transfer neural network trained via machine learning on a plurality of target style images.

27. The multiview style transfer method of claim 25, further comprising:
receiving a target style image;
identifying a target style based on application of a neural style transfer (NST) algorithm to the target style image; and
generating the style transfer model based on the target style.

28. The multiview style transfer method of claim 15, wherein the first disparity map is generated based on the first image and the second image, the first disparity map representing differences in horizontal coordinates of a first plurality of image points in the first image relative to a second plurality of image points in the second image; and
wherein a second disparity map is generated based on the first image and the second image, the second disparity map representing differences in horizontal coordinates of the second plurality of image points in the second image relative to the first plurality of image points in the first image.

* * * * *